E. F. TOWNSEND.
TRACTOR.
APPLICATION FILED MAY 2, 1918.
1,305,506.
Patented June 3, 1919.
3 SHEETS—SHEET 3.
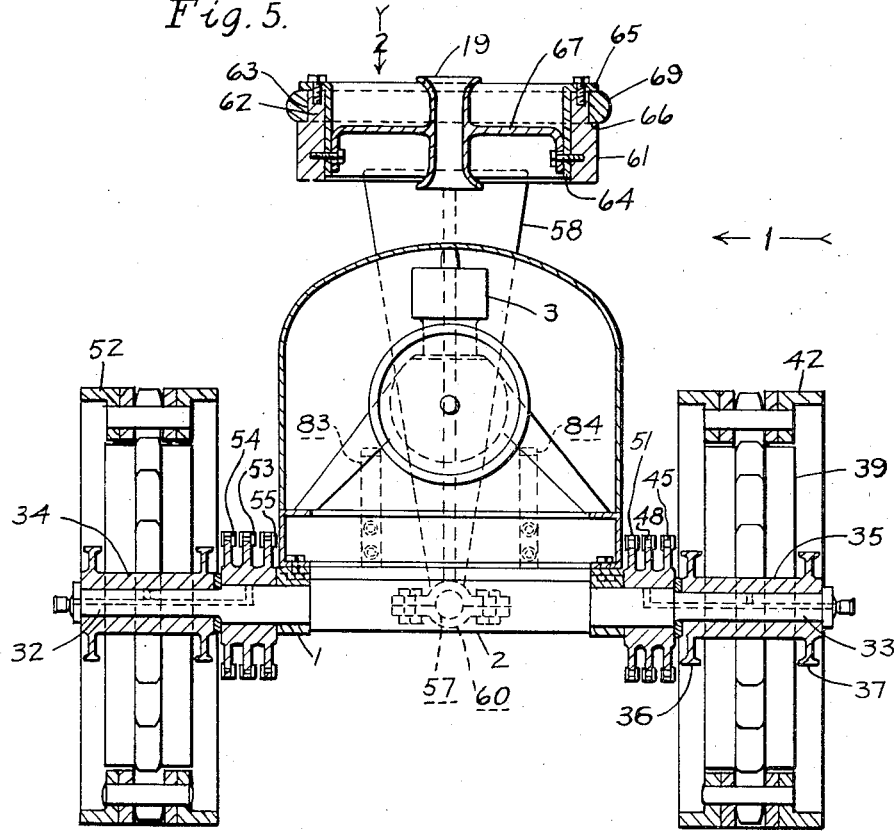
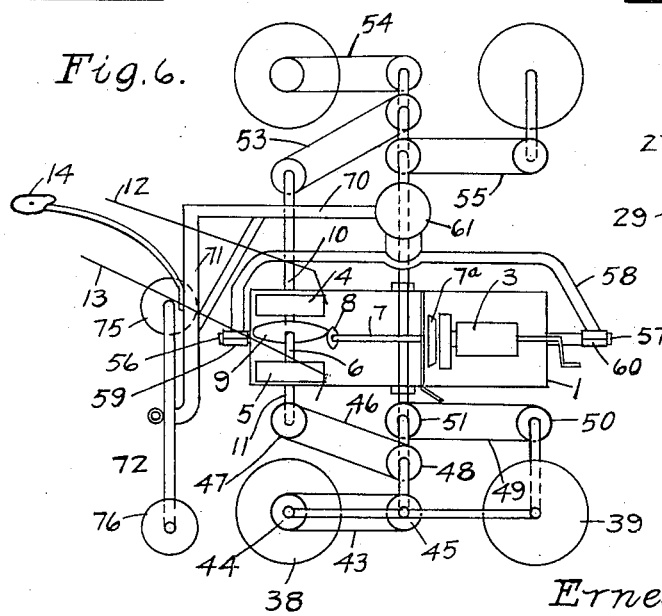
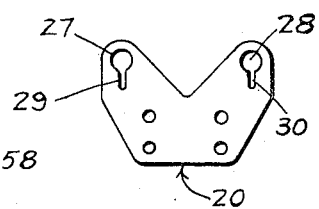
Inventor:
Ernest F. Townsend,
by Hazard and Miller
Att'ys.

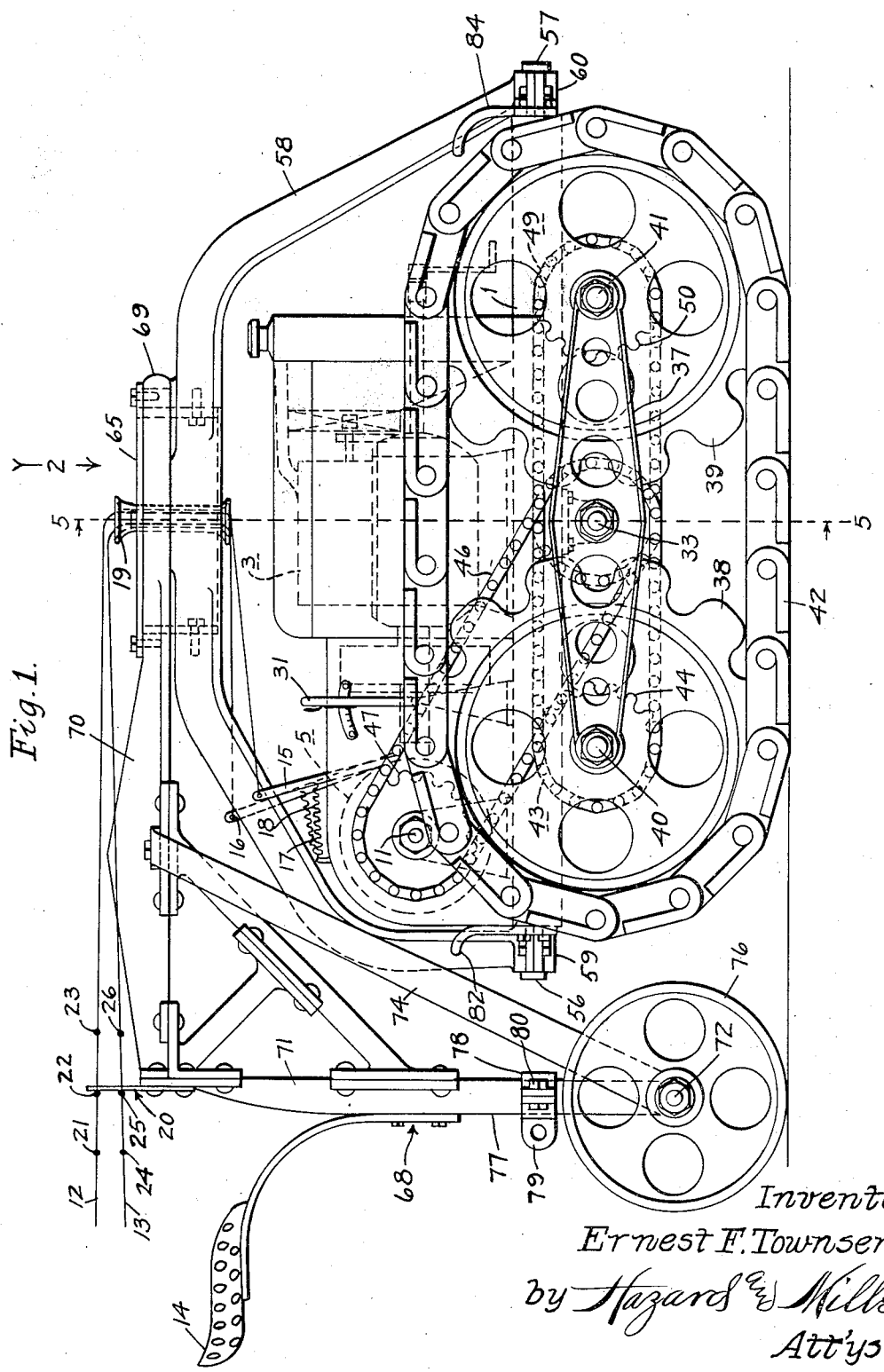

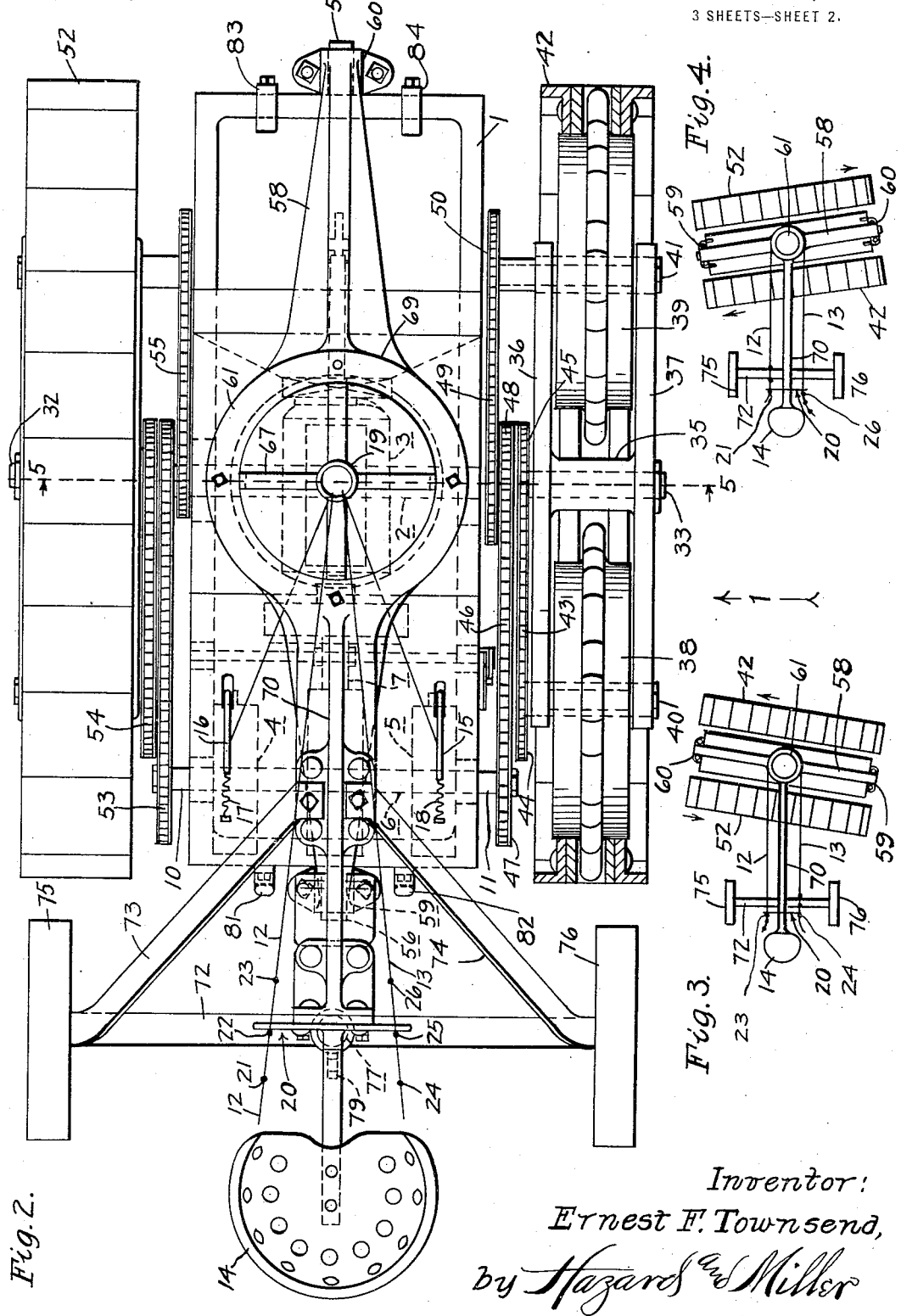

UNITED STATES PATENT OFFICE.

ERNEST F. TOWNSEND, OF LOS ANGELES, CALIFORNIA.

TRACTOR.

1,305,506.     Specification of Letters Patent.     Patented June 3, 1919.

Application filed May 2, 1918. Serial No. 232,123.

*To all whom it may concern:*

Be it known that I, ERNEST F. TOWNSEND, a citizen of the United States, residing at Los Angeles, in the county of Los Angeles and State of California, have invented new and useful Improvements in Tractors, of which the following is a specification.

My object is to make a tractor which may be driven with two lines like a horse, the tractor having a draft rigging connected at its plan center so that the tractor may turn upon its center with the load standing still.

My present invention is an improvement upon or alternative to the invention shown, described and claimed in my companion application for a tractor filed January 23, 1918, Serial No. 213,313.

Figure 1 is a side elevation of a tractor embodying the principles of my invention as seen looking in the direction indicated by the arrow 1 in Fig. 2.

Fig. 2 is a top plan view as indicated by the arrow 2 in Fig. 1, parts being broken away and shown in section.

Figs. 3 and 4 are diagrammatic views illustrating the operation.

Fig. 5 is a vertical cross section on the lines 5—5 of Figs. 1 and 2.

Fig. 6 is a diagrammatic view of the operating parts of the entire tractor.

Fig. 7 is a view of the sector plate.

The main frame 1 is fixed upon a single axle 2, the axle 2 being located transversely of the frame substantially at its longitudinal center. The engine 3 is mounted upon the forward part of the frame 1 and the independent reversible transmissions 4 and 5 are mounted upon the rear end of the frame. The drive shaft 6 is mounted transversely of the frame and drives both transmissions. The engine 3 is connected to the line shaft 7 by a clutch 7*, and the line shaft 7 is connected upon the line shaft to the drive shaft 6 by a bevel pinion 8 meshing with a bevel gear 9 upon the drive shaft 6 so that when the engine is running and the clutch 7* connected, the drive shaft 6 will be driven continuously in one direction. The counter shafts 10 and 11 extend from the transmissions 4 and 5 and the transmissions are controlled by the lines 12 and 13, so that the operator upon the seat 14 may optionally drive the counter shafts 10 and 11 as required to maneuver the tractor. The transmissions 4 and 5 may be of the planetary type or of any of the well known types, which may be stopped, started and reversed while the engine is running continuously.

The counter shaft 10 drives the traction mechanism at one side of the frame 1 and the counter shaft 11 drives the traction mechanism at the other side of the frame 1, so that either mechanism may be operated independently of the other forwardly or backwardly, or one standing still while the other runs.

The transmissions 4 and 5 are controlled by levers 15 and 16; said levers being pulled backwardly to drive the tractor forwardly by springs 17 and 18. The lines 12 and 13 extend from the upper ends of the levers 15 and 16 forwardly and upwardly through a tube 19, and then backwardly through a sector plate 20 to the operator's hands. Stops 21, 22, and 23 are formed upon the line 12 and similar stops 24, 25, and 26 are formed upon the line 13. The sector plate 20 has an opening 27 for the line 12 and an opening 28 for the line 13; said openings being large enough to allow the stops to pass freely and there being clutching slots 29 and 30 extending laterally from the openings to receive the lines 12 and 13 and hold the stops. When it is desired to start the engine the lines 12 and 13 are manipulated to pull the stops 22 and 25 through the openings 27 and 28 and pass the lines into the slots 29 and 30 so as to hold the levers 15 and 16 to hold the transmissions 4 and 5 neutral, then the engine may be started and the clutch lever 31 manipulated to connect the engine to the drive shaft 6. Then if the line 12 is manipulated to allow the stop 22 to pass through the opening 27 to the stop 21 the spring 17 will move the lever 16 backwardly to operate the transmission 4 to drive forwardly, then if the line 13 is correspondingly manipulated the transmission 5 will drive forward. If it is desired to turn, either transmission may be stopped or reversed one transmission run backwardly and the other forwardly. If the lines 12 and 13 are manipulated to pull the stops 23 and 26 through the openings 27 and 28, then both transmissions will drive backwardly, and if the lines are manipulated to bring the stops 21 and 24 against the sector plate 20, both transmissions will drive forwardly. By running the lines 12 and 13 through the tube 19, which is centrally located, vertically through the king bolt construction, the swinging of the frame 1 will not change the lengths of the lines or the distances between the sector plate 20 and the levers 15 and 16.

Pivots 32 and 33 extend from the ends of the axle 2 beyond the face of the frame 1; hubs 34 and 35 are rotatably mounted upon these pivots 32 and 33. Reaches 36 and 37 extend equal distances both ways from the ends of the hub 35. Traction sprocket wheels 38 and 39 are mounted between the ends of the reaches 36 and 37; there being shafts 40 and 41 extending through bearings in the ends of the reaches and through the hubs of the sprocket wheels; said shafts being keyed to the hubs. A traction tread belt 42 runs upon the sprocket wheels 38 and 39. A chain 43 connects a driven sprocket 44 upon the inner end of the shaft 40 to a driving sprocket 45 loosely mounted upon the ends of the axle 2. A chain 46 connects the driving sprocket 47 fixed upon the end of the shaft 11 to a driven sprocket 48 rigid with the sprocket 45. A chain 49 connects a driven sprocket 50 upon the inner end of the shaft 41 to the sprocket 51 rigid with the sprockets 45 and 48 so that when the shaft 11 is driven forwardly or backwardly, the traction tread belt 42 is driven so that the reaches 36 and 37 may oscillate freely upon the pivot 33.

In a like manner the traction tread chain 52 is mounted relative to the hub 34 to oscillate upon the pivot 32 and said traction tread chain 52 is driven from the shaft 10 through chains 53, 54, and 55.

The traction tread chains 42 and 52 are not only independently driven from their transmissions 4 and 5, but they are mounted to independently oscillate upon their pivots as required to travel freely over uneven ground.

Pivots 56 and 57 extend from the ends of the frame 1 at the transverse center of the frame, and a rocker 58 has bearings 59 and 60 loosely mounted upon these pivots 56 and 57, the rocker extending over the power construction mounted upon the frame 1, so that either the frame or the rocker may oscillate transversely upon the pivots 56 and 57 as well as longitudinally upon the pivots 32 and 33.

A large king bolt bearing 61 is formed vertically at the center of the rocker 58; the center of said bearing being the vertical axis of the tractor mechanism. An annular flange 62 extends upwardly from the body of the bearing 61 and has a machined outer face 63; said flange serving as a king bolt. A tube 64 is inserted downwardly through the annular flange 62 and has a flange 65 extending outwardly over the flange 62 and beyond the machined outer face 63 so as to form a channel 66 around the king bolt. A spider 67 is mounted in the tube 64 and the tube 19 is carried by this spider so as to bring the center of the tube 19 in line with the vertical axis of the tractor.

A draft rigging 68 has a bearing 69 fitting in the channel 66, a beam 70 extends backwardly from the bearing 69, a post 71 extends downwardly from the rear end of the beam 70, a cross bar 72 is connected to the low end of the post 71, braces 73 and 74 connect the ends of the cross bar 72 to the central portion of the beam 70, wheels 75 and 76 are mounted upon suitable spindles extending from the ends of the cross bar 72 and the seat 14 is mounted upon a spring extending upwardly and backwardly from the post 71. The lower end of the post 71 has a straight vertical round bearing surface 77 and a split clamping bearing 78 is adjustably mounted upon this bearing surface 77 and has an ear 79 to which the farm implements or a trailer may be attached so that by loosening the nut 80 of the clamping bearing 78 the bearing may be raised or lowered upon the post and clamped in its adjusted position.

The wheels 75 and 76 are a considerable distance apart and form a base for holding the rocker 58 upright, and said wheels are a sufficient distance from the tractor to allow the tractor to swing around and around in either direction upon the king bolt 63 as a pivot. The draft rigging 68 running upon its own base may rock back and forth transversely independent of the rocking of the tractor, and either the tractor treads or the draft rigging may rock forwardly and backwardly in a longitudinal line independent of each other.

Stops 81 and 82 are secured to the rear end of the frame 1 and extend upwardly on each side of the rocker 58, and similar stops 83 and 84 are secured to the forward end of the main frame 1 and extend upwardly on each side of the rocker 58 to limit the transverse rocking of the tractor relative to the rocker 58. It is intended to provide ample movement between the rocker 58 and the stops 81, 82, 83, and 84, the principal purpose of the stops being to prevent the tractor from turning completely over sidewise.

Thus I have produced a tractor having two two-wheel chain treads, the treads being pivotally connected to the main frame so they may rock longitudinally independent of each other, and I have connected a draft rigging to the tractor so that the tractor may turn upon its vertical axis relative to the draft rigging, and so that either the tractor or the draft rigging may rock transversely independent of the other, and I have provided means whereby an operator riding upon the draft rigging may control the tractor with two lines to stop, start, go ahead, go backward, or go ahead on one side and backward on the other side, and I have provided means whereby the lines may be handled and operated accurately and without chance of confusion and mistake.

Various changes may be made without departing from the spirit of my invention, as claimed.

I claim:

1. In a tractor, a main frame, pivots extending transversely in the main frame, tractor tread chain constructions mounted upon the pivots to rock independently of each other, a rocker mounted upon the main frame to rock transversely, a king bolt construction upon the rocker, a draft rigging connected to the king bolt construction, an engine upon the main frame, independent reversible transmissions connected to the engine; one for each tractor tread construction; a sector plate upon the draft rigging and lines connected to the transmissions and running through the king bolt and through the sector plate; there being stops upon the lines with relation to the sector plate so that the operations of the transmissions may be regulated by the stops.

2. In a tractor, a main frame, pivots extending transversely in the main frame, tractor tread chain constructions mounted upon the pivots to rock independently of each other, a power plant upon the main frame, independent transmissions connecting the power plant to the pivots and connections from the pivots to both ends of the tractor tread chain constructions so as to drive both ends of the tread constructions simultaneously, and so as to drive either construction independently of each other, and so as to drive the constructions in opposite directions when desired, a rocker mounted upon the main frame to rock transversely, a king bolt construction upon the rocker, and a draft rigging connected to the king bolt construction and supported by two wheels running upon the ground so as to hold the main frame normally level longitudinally and so as to allow the main frame to rock transversely.

3. In a tractor, a main frame, pivots extending transversely in the main frame, tractor tread chain constructions mounted upon the pivots to rock independently of each other, means for holding the main frame from tipping on the pivots, a power plant upon the main frame, independent transmissions connecting the power plant to the pivots, and connections from the pivots to both ends of the tractor tread chain constructions so as to drive both ends of the tread constructions simultaneously and so as to drive either construction independently of the other and so as to drive the constructions in opposite directions when it is desired.

4. In a tractor, a main frame, pivots extending transversely in the main frame, tractor tread chain constructions mounted upon the pivots to rock independently of each other, a power plant mounted upon the main frame, independent transmissions connecting the power plant to the independent tractor tread chain constructions so as to drive both ends of the tractor tread chain constructions simultaneously and so as to drive either forwardly or backwardly independently of the other, a rocker mounted upon the main frame to rock transversely, a king bolt construction upon the rocker, and a draft rigging connected to the king bolt construction and supported by two wheels running upon the ground so as to hold the main frame normally level longitudinally and so as to allow the main frame to rock transversely.

5. In a tractor, a main frame, pivots extending transversely in the main frame, tractor tread chain constructions mounted upon the pivots to rock independently of each other, a power plant mounted upon the main frame, independent transmissions connecting the power plant to the independent tractor tread chain constructions so as to drive both ends of the tractor tread chain constructions simultaneously and so as to drive either forwardly or backwardly independently of the other, a rocker mounted upon the main frame to rock transversely, a king bolt construction upon the rocker, a draft rigging connected to the king bolt construction and supported by two wheels running upon the ground so as to hold the main frame normally level longitudinally and so as to allow the main frame to rock transversely, and independent lines connected to the independent transmissions so that by manipulating the lines the transmissions may be operated to stop, start, go ahead, go backward, or go ahead on one side and backwardly on the other side.

In testimony whereof I have signed my name to this specification.

ERNEST F. TOWNSEND.